United States Patent
Storm

(10) Patent No.: US 8,015,314 B1
(45) Date of Patent: *Sep. 6, 2011

(54) METHOD FOR CONFIGURING A NETWORK ELEMENT HAVING AN UNKNOWN PROTOCOL ADDRESS

(75) Inventor: Kim F. Storm, Kobenhavn S (DK)

(73) Assignee: F5 Networks, Inc., Seattle, WA (US)

( * ) Notice: Subject to any disclaimer, the term of this patent is extended or adjusted under 35 U.S.C. 154(b) by 6 days.

This patent is subject to a terminal disclaimer.

(21) Appl. No.: 12/348,846

(22) Filed: Jan. 5, 2009

Related U.S. Application Data

(62) Division of application No. 09/826,266, filed on Apr. 3, 2001, now Pat. No. 7,487,253.

(51) Int. Cl.
*G06F 15/16* (2006.01)
*G06F 15/173* (2006.01)
*G06F 15/177* (2006.01)

(52) U.S. Cl. .......... 709/236; 370/389; 370/468; 710/31; 710/100

(58) Field of Classification Search .................. 709/236, 709/220, 217, 227; 370/389, 468; 710/31, 710/100
See application file for complete search history.

(56) References Cited

U.S. PATENT DOCUMENTS

| | | | |
|---|---|---|---|
| 5,884,024 A | 3/1999 | Lim et al. | |
| 6,163,823 A | 12/2000 | Henrikson | |
| 6,204,084 B1 | 3/2001 | Sugiura et al. | |
| 6,466,986 B1 * | 10/2002 | Sawyer et al. | 709/245 |
| 6,546,425 B1 | 4/2003 | Hanson et al. | |
| 6,594,713 B1 | 7/2003 | Fuoco et al. | |
| 6,629,145 B1 * | 9/2003 | Pham et al. | 709/230 |
| 6,697,360 B1 * | 2/2004 | Gai et al. | 370/389 |
| 7,281,036 B1 * | 10/2007 | Lu et al. | 709/220 |
| 7,487,253 B1 * | 2/2009 | Storm | 709/236 |
| 2002/0172222 A1 | 11/2002 | Ullmann et al. | |
| 2005/0188092 A1 * | 8/2005 | Short et al. | 709/227 |

OTHER PUBLICATIONS

Plummer, David C., RFC826 "An Ethernet Address Resolution Protocol-or-Converting Network Protocol Addresses to 48.bit Ethernet Address for Transmission on Ethernet Hardware," Network Working Group, Nov. 1982, pp. 1-8, http://www.ietf.org/rfc/rfc826.txt.

* cited by examiner

*Primary Examiner* — Haresh N Patel
(74) *Attorney, Agent, or Firm* — Frommer Lawrence & Haug LLP; Jamie L. Wiegand

(57) ABSTRACT

A method and system of simplified configuration of a network element. A network element having a direct access module and an arbitrary unknown address is coupled to a same physical subnet as a management node. The management node broadcasts a discovery broadcast to identify the existence of the network element. If a response is received indicating an address outside an access range of the management node, it sends an additional broadcast targeted to the network element force the network element to change its address to one within an access range of the management node. Once the address is changed, the management node may connect to and configure the network element using standard protocols.

16 Claims, 3 Drawing Sheets

METHOD FOR CONFIGURING A NETWORK ELEMENT HAVING AN UNKNOWN PROTOCOL ADDRESS

CROSS-REFERENCE TO RELATED APPLICATIONS

This application is a divisional patent application of U.S. patent application Ser. No. 09/826,266, now U.S. Pat. No. 7,487,253, filed Apr. 3, 2001, entitled "Method For Configuring A Network Element Having An Unknown Protocol Address," claiming the benefit under 35 U.S.C. §121, and which is further incorporated herein by reference.

BACKGROUND

1. Field of the Invention

The invention relates to networking. More specifically, the invention relates to configuration of a network element having an unknown protocol address.

2. Background

Internet protocol (IP) is a predominant networking protocol in use today. This is due at least in part to the fact that IP divides the network into subnets and is therefore highly scaleable and suitable for implementation of very large networks. Using IP, the management device is only able to access and therefore configure those devices having a same subnet address as the management device. Accordingly, for configuration purposes, a network element with an unknown IP address typically would be coupled to the management device via a serial port. The network element could then be manually configured via the serial port to use an IP address in the same subnet of the management device. Without a serial port, configuring a network element without a known IP address would normally require an external reset of the network element's configuration (typically via a reset switch) to force the network element to use a well-defined IP address, and then reconfigure the management device to use an IP address in the same subnet. When the number of devices to be configured increases, the inconvenience of this method of configuration similarly increases.

BRIEF DESCRIPTION OF THE DRAWINGS

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

DETAILED DESCRIPTION

Figures 1, 2A, 2B:
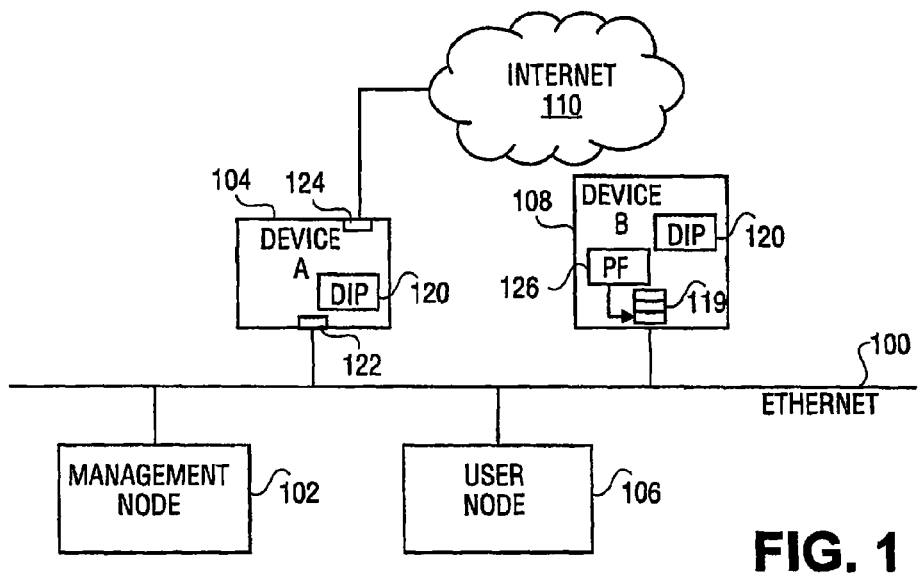
FIG. 1 is a block diagram of the system of one embodiment of the invention.
FIG. 2A is a schematic diagram of a typical prior art Ethernet frame.
FIG. 2B is a schematic diagram of Ethernet frame that might be constructed by a management node in one embodiment of the invention.

FIG. 1 is a block diagram of the system of one embodiment of the invention. Ethernet 100 couples a management node 102 to a user node 106 and the device A 104 and device B 108. Device A 104 and device B 108 are network elements. In one embodiment, the network element may be for example, the InterJak™ 200 available from Filanet Corporation of Sunnyvale, Calif. As described, Ethernet 100 forms a physical subnet of management node 102. As used herein, "physical subnet" is deemed to include all network elements on the local network reachable without passing through a router.

Device A 104 includes a direct internet protocol (DIP) module 120 which is described in more detail below. Device A 104 is able to receive and process packets directly to the DIP module 120. Device B 108 is not able to do this, so it includes a packet filter 126 to snoop lower layers of the protocol stack B 119 and copy the relevant packets to the DIP module 120. Device A 104 also has an external port 124 by which it is coupled to internet 110. Device A 104 also has a local port 122 by which is connected to management node 102 over the Ethernet 100. In one embodiment, the DIP module is only active on local port 122 and the DIP module may also only be enabled for a limited time after power up. Such an embodiment reduces the risk of an intentional or unintentional interruption in connectivity resulting from reconfiguration.

At power up, it is presumed that the management node 102 does not know the IP address for device A 104 or device B 108. Moreover, management node 102 has no assurance that such devices even have a same subnet address as the management node 102. Thus, under traditional IP it may not be possible for the management node to interact with and/or configure device A 104 or device B 108. However, when the DIP module 120 is active, management node 102 may create a broadcast frame appropriately directed to be received by the DIP module 120 and broadcast it over the physical subnet. In its simplest form, the physical subnet could be merely the management node coupled directly by an Ethernet cable to a single device. However, a more expansive subnets such as that shown in FIG. 1 are within the scope and contemplation of the invention.

Device A 104 and device B 108 will each respond to the broadcast packet, thereby providing the management node 102 with their current respective addresses. If each such address is within the management node's subnet, the management node is able to immediately connect via those addresses and appropriately configure the network elements. However, when the subnet addresses do not match, the management node 102 may force either device A 104 or device B 108 to change its IP address to one within the management node's subnet. In doing this, the management node 102 must identify an unused IP address within its subnet and provide that address to only one of the network elements. Details of this operation will be described in referenced FIG. 3 below. The other device may subsequently be forced to change its address as well by repeating the procedure.

FIG. 2A is a schematic diagram of a typical prior art Ethernet frame. A typical Ethernet frame includes a series of headers. A hardware header includes a hardware address field and a protocol specification field in this example specifying IP protocol. An IP header includes an IP address field and protocol field, in this case, specifying transmission control protocol (TCP). The IP header is followed by a TCP header specifying a Tep port indicating an application protocol, in this case, hypertext transfer protocol (HTTP). Next comes an HTTP header with an HTTP request code. This generalized format is common to existing Ethernet frames.

FIG. 2B is a schematic diagram of Ethernet frame that might be constructed by a management node in one embodiment of the invention. A hardware header 200 includes a hardware address field 210 and a hardware protocol field 212, e.g., specifying the IP protocol. The protocol header 202 includes a protocol address field 214 and a subprotocol field 216, e.g, specifying user datagram protocol (UDP). Subprotocol header 204 includes a port field 218 specifying an application protocol, direct IP in this case. A direct IP header is also provided, including a direct IP request code field 222. The direct IP header may also include a hardware address field to identify the target network element and a field to contain the network elements' IP address in responses or a forced IP address in force requests. In some embodiments, control or status fields are also provided. In one such embodiment, a flag is set in a defined status field when the time during which the DIP module is active, e.g., the address can be forced, has expired. By appropriately setting the hardware address field 210 and the protocol address field 214 to indicate all addresses and by selecting UDP as the subprotocol in the subprotocol field 216, the frame will not be screened out by the protocol stack in devices on the physical subnet to be configured even when the devices have a different subnet address. By appropriately selecting the UDP port number to be one recognized by the DIP module, if that module is enabled, it will accept the frame and handle the frame appropriately. Unlike Tcp, UDP is not connection based and is therefore more suitable for a generalized case of an unknown device address.

Alternatively, the device may be provided with a packet filter that permits the device to snoop at the hardware level and then require the protocol stack 119 to, e.g., only screen based on hardware address and port number. In this manner, regardless of the IP header, if the hardware address and port number are directed to the DIP module, the frame will be forwarded to the DIP module. Devices operating with a linux kernal support this packet filtering capability as well as the other embodiment described above.

Figure 3:
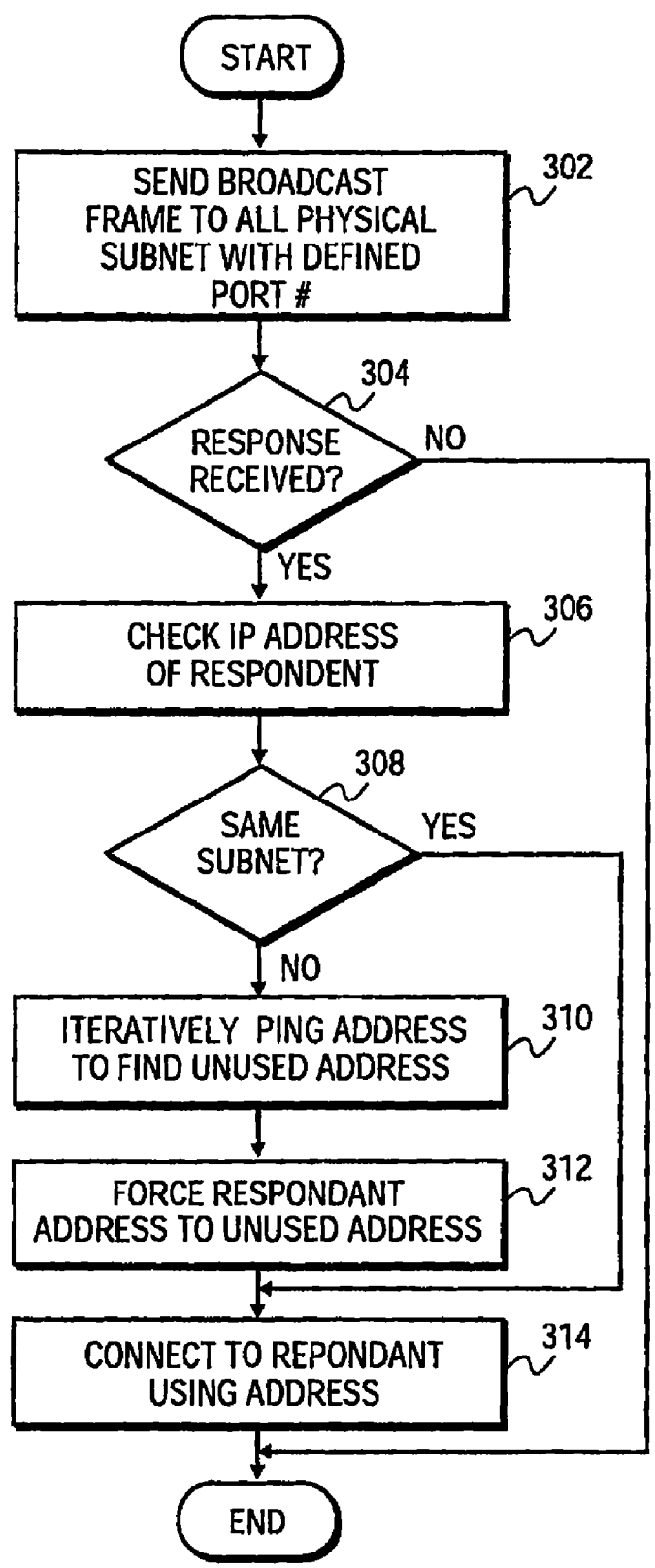
FIG. 3 is a flow diagram of operation by the management node in one embodiment of the invention.

FIG. 3 is a flow diagram of operation by the management node in one embodiment of the invention. At functional block 302, the management node sends a broadcast frame with a defined port number (consistent with direct IP) to all devices on the physical subnet. Because any devices not having a DIP module will discard the packet, if a response is received, a device exists that may need configuration. At decision block 304, the response is checked for the respondents current protocol, e.g., (IP) address at functional block 306. At decision block 308/a determination is made if the current protocol address is in the access range of the management node. For example, is the protocol address within the same subnet? If the current protocol address is not within the same subnet (access range), the management node iteratively queries addresses within the subnet until an unused address is found at functional block 310. In one embodiment the management node may use internet control management protocol (ICMP) echo request (commonly known as a "ping") to perform the query. As this is a standard way to determine connectivity, the absence of a response to a ping indicates an unused IP address. In another embodiment, the management node may use the address resolution protocol (ARP) to perform the query. At functional block 312 of the management node creates and sends a frame to the respondent to force the respondent to change his address to the unused address identified in functional block 310. In one embodiment, this forcing frame may be constructed as a broadcast frame with a hardware address designated as "All," an IP address as "All/' the appropriate UDP port, and the target hardware address in a direct IP header field. Alternatively, in another embodiment, the hardware address of the target device may be used in the hardware address header of the forcing packet. By using the hardware address as a target identifier, the risk of two devices on the physical subnet being forced to a single address is ameliorated. Once the change is complete or if at decision block 308 the existing address is within the management node's access range, the management node may connect normally to the respondent using the then existing address and configure the device normally over the network. As applied to IP configuration, the above method permits connection between a device and to management node using repIIP after the exchange of only three Ethernet frames. Notably, the configuration of the management node need not change and no reboot is required. Moreover, configuration can be accomplished in the absence of a serial port via a standard Ethernet connection.

Figure 4:
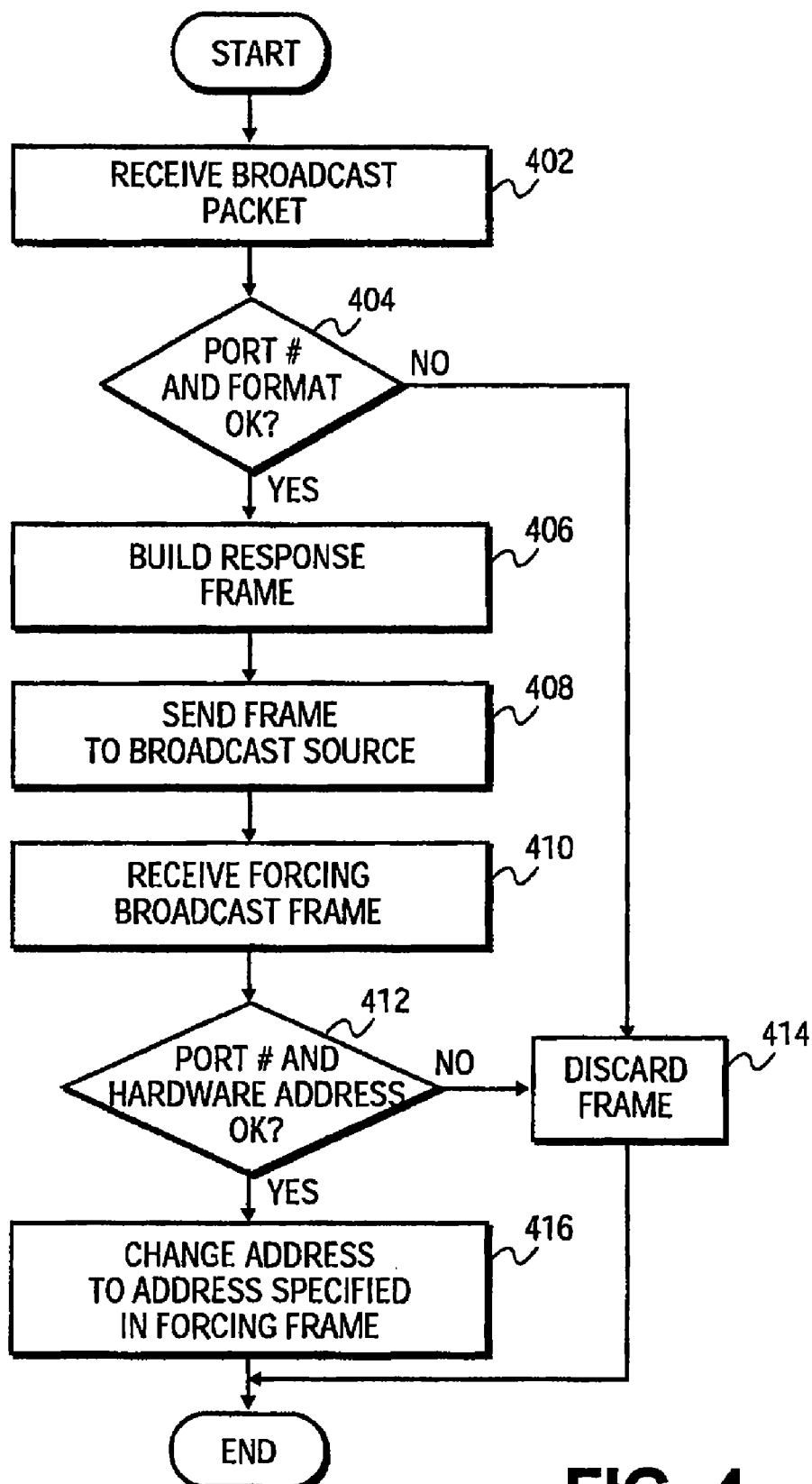
FIG. 4 is a flow diagram of an operation of a network element in one embodiment of the invention.

FIG. 4 is a flow diagram of an operation of a network element in one embodiment of the invention. At functional block 402, the device receives a broadcast packet. At decision block 404, a determination is made if the broadcast frame received is for the port and of the appropriate format for the DIP module of the device. In one embodiment packet filtering is used. In another embodiment no filtering is required because the frame is constructed to pass through the protocol stack without filtering. If it is, at functional block 406, the device builds a response frame including its hardware address and its current protocol address. In functional block 408, it sends the frame to the source of the broadcast frame. In one embodiment, the device is able to send the response at a sufficiently low level, e.g., the hardware level, that the frame can be specifically directed to the broadcast source. In another embodiment, the device creates a broadcast frame with the original broadcaster's hardware address contained in an appropriate field within the direct IP header. At functional block 410, a forcing broadcast frame is received. At decision block 412, a determination is made if the forcing frame is directed to the correct number and matches the hardware address of the device. If it does not match the port number and hardware address at decision 412 or the port and format were not okay at decision block 404, the frame is discarded at functional block 414. If the port number and hardware address are okay at decision block 412, the device changes its protocol address to the address specified in the forcing frame at functional block 416.

Further, computer readable storage media containing executable computer program instructions which when executed cause a digital processing system to perform the method of FIG. 3, or the method of FIG. 4.

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

The invention claimed is:
1. A system, comprising:
a management device; and
a device that is coupled together to the management device by a same physical subnet, and wherein the device is configured to perform actions, including:
  receiving a first broadcast frame over a network from the management device;
  snooping a hardware layer of a protocol stack for a frame directed to a predetermined port;
  forwarding the frame past a protocol layer independent of a protocol address when directed to the predetermined port;

identifying whether the first broadcast frame is directed to the predetermined port;
sending a response frame to a source of the first broadcast frame when the first broadcast frame was directed to the predetermined port, the response frame including the current protocol address;
receiving a forcing frame directed to a predetermined port and including the hardware address of the device;
changing a current protocol address of the device to a new protocol address specified in the forcing frame, wherein the current protocol address is outside an address range of the management device and the new protocol address is within the address range of the management device; and
connecting to the management device using the new protocol address using Transmission Control Protocol (TCP).

2. The system of claim 1, wherein the device performs actions, further comprising:
enabling receipt of the forcing frame directed to the predetermined port only on a local port of the device; and
disabling receipt on the local port a fixed time after power up.

3. The system of claim 1 wherein the forcing frame is a broadcast frame specifying all hardware addresses and all protocol addresses.

4. The system of claim 1 wherein receiving a first broadcast frame comprises:
passing the first broadcast frame through a hardware layer and a protocol layer of a protocol stack based on a selection of all addresses in a hardware address field and a protocol address field of the first broadcast frame.

5. A non-transitory computer readable storage media containing executable computer program instructions which when executed cause a digital processing system operating as a management device to perform actions, comprising:
broadcasting a first frame on a physical subnet the first frame containing a predetermined port number;
checking a response for a current protocol address of a responding device, wherein the responding device is coupled to the management device through the physical subnet; and
forcing the responding device to change to a new protocol address when the current protocol address is not within an access range of the management device such that the forced change to the new protocol address permits connection between the management device and the responding device, after an exchange of at least three frames and wherein the responding device is further configured to:
snoop a hardware layer of a protocol stack for a frame directed to the predetermined port number and forward the frame past a protocol layer independent of a protocol address when directed to the predetermined port number, and wherein the management device further broadcasts a second frame on the physical subnet directed to the predetermined port number, the second frame including a hardware address of the responding device and the new protocol address.

6. The non-transitory computer readable storage media of claim 5, wherein the management device performs actions, further comprising:
identifying an unused address to be used as the new protocol address.

7. The non-transitory computer readable storage media of claim 6, wherein the management device performs actions further comprising:
iteratively querying addresses within the access range until no response is received to a query.

8. The non-transitory computer readable storage media of claim 5, wherein the management device performs actions further comprising:
setting a hardware address in the first frame to all addresses;
setting an interne protocol (IP) address in the first frame to all addresses; and
setting a user datagram protocol (UDP) port number in the first frame to the predetermined port.

9. A non-transitory computer readable storage media containing executable computer program instructions which when executed cause a device to perform actions, comprising:
receiving a first broadcast frame over a network from a management device;
identifying whether the first broadcast frame is directed to a predetermined port;
sending a response frame to a source of the first broadcast frame when the first broadcast frame was directed to the predetermined port, the response frame including a current protocol address;
snooping a hardware layer of a protocol stack for a frame directed to the predetermined port;
forwarding the frame past a protocol layer independent of a protocol address when directed to the predetermined port;
receiving a forcing frame directed to the predetermined port and including a hardware address of the device, wherein the device is coupled together to the management device on a same physical subnet;
changing, based on receipt of the forcing frame, a current protocol address of the device to a new protocol address specified in the forcing frame, wherein the current protocol address is outside an address range of the management device and the new protocol address is within the address range of the management device; and
connecting to the management device using the new protocol address.

10. The non-transitory computer readable storage media of claim 9, wherein the device performs actions, further comprising:
enabling receipt of the frame directed to the predetermined port only on a local port of the network element device; and
disabling receipt on the local port a fixed time after power up.

11. The non-transitory computer readable storage media of claim 9, wherein the device performs actions, further comprising:
the forcing frame is a broadcast frame specifying all hardware addresses and all protocol addresses.

12. The non-transitory computer readable storage media of claim 9, wherein the device performs actions further comprising:
passing the frame through a hardware layer and a protocol layer of a protocol stack based on a selection of all addresses in a hardware address field and a protocol address field of the first broadcast frame.

13. A management device, comprising:
memory; and
a processor configured to perform actions, including:
broadcasting a first frame on a physical subnet, the first frame containing a predetermined port number;

checking a response for a current protocol address of a responding device, wherein the responding device is coupled to the management device by the physical subnet; and forcing the responding device to change to a new protocol address when the current protocol address is not within an access range of the management device such that the forced change to the new protocol address permits connection between the management device and the responding device, wherein the responding device is further configured to:

snoop a hardware layer of a protocol stack for a frame directed to the predetermined port and forward the frame past a protocol layer independent of a protocol address when directed to the predetermined port, and wherein forcing the responding device to change to a new protocol address comprises broadcasting a second frame on the physical subnet directed to the predetermined port number, the second frame including a hardware address of the responding device and the new protocol address.

14. The management device of claim 1, wherein the processor is configured to perform actions, further comprising:

identifying an unused address to be used as the new protocol address.

15. The management device of claim 14 wherein identifying an unused address comprises:

iteratively querying addresses within the access range until no response is received to a query.

16. The management device of claim 13 wherein broadcasting a first frame comprises:

setting a hardware address in the first frame to all addresses;

setting an interne protocol (IP) address in the first frame to all addresses; and setting a user datagram protocol (UDP) port number in the first frame to the predetermined port.

* * * * *

UNITED STATES PATENT AND TRADEMARK OFFICE
CERTIFICATE OF CORRECTION

| | | |
|---|---|---|
| PATENT NO. | : 8,015,314 B1 | Page 1 of 1 |
| APPLICATION NO. | : 12/348846 | |
| DATED | : September 6, 2011 | |
| INVENTOR(S) | : Kim F. Storm | |

It is certified that error appears in the above-identified patent and that said Letters Patent is hereby corrected as shown below:

In column 2, line 60, delete "Tep port" and insert -- TCP port --, therefor.

In column 3, line 23, delete "Tep," and insert -- TCP, --, therefor.

In column 3, line 33, delete "kernal" and insert -- kernel --, therefor.

In column 3, line 44, delete "308/a" and insert -- 308, a --, therefor.

In column 3, line 62, delete ""All/"" and insert -- "All," --, therefor.

In column 8, line 1, in Claim 14, delete "claim 1," and insert -- claim 13, --, therefor.

Signed and Sealed this
Tenth Day of January, 2012

David J. Kappos
*Director of the United States Patent and Trademark Office*